US012504401B2

(12) United States Patent
Yang et al.

(10) Patent No.: US 12,504,401 B2
(45) Date of Patent: Dec. 23, 2025

(54) PHOTOIONIZATION DETECTOR WITH LAYERED ELECTRODES

(71) Applicant: HONEYWELL INTERNATIONAL INC., Charlotte, NC (US)

(72) Inventors: Fan Yang, Charlotte, NC (US); Renbing Tian, Charlotte, NC (US); Hao Zhu, Charlotte, NC (US); Feng Liang, Charlotte, NC (US); Jun Tang, Charlotte, NC (US); Peipei Liu, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 274 days.

(21) Appl. No.: 18/295,884

(22) Filed: Apr. 5, 2023

(65) Prior Publication Data

US 2023/0341353 A1    Oct. 26, 2023

(30) Foreign Application Priority Data

Apr. 20, 2022  (CN) .......................... 202210414854.9

(51) Int. Cl.
*G01N 27/66* (2006.01)
*G01N 33/00* (2006.01)

(52) U.S. Cl.
CPC ......... *G01N 27/66* (2013.01); *G01N 33/0047* (2013.01)

(58) Field of Classification Search
CPC ............................ G01N 27/66; G01N 33/0047
See application file for complete search history.

(56) References Cited

U.S. PATENT DOCUMENTS

| 5,572,137 A | 11/1996 | Jones |
| 10,942,061 B2 | 3/2021 | Chen et al. |

FOREIGN PATENT DOCUMENTS

| CN | 101504388 A | 8/2009 | |
| CN | 206671256 U | 11/2017 | |
| CN | 112834490 A | 5/2021 | |
| DE | 19535216 C1 * | 2/1997 | ............. G01N 27/66 |
| EP | 0595929 B1 | 8/1998 | |
| WO | 2017/122339 A1 | 7/2017 | |
| WO | 2018/112732 A1 | 6/2018 | |
| WO | WO-2018112733 A1 * | 6/2018 | ............ G01J 1/0437 |

OTHER PUBLICATIONS

English translation of DE 19535216 C1 (Year: 1995).*
Intention to grant Mailed on Jun. 6, 2024 for EP Application No. 23166723, 9 page(s).
European search report Mailed on Dec. 2, 2024 for EP Application No. 24211559, 8 page(s).
European search report Mailed on Nov. 24, 2023 for EP Application No. 23166723, 21 page(s).
Decision to grant a European patent Mailed on Oct. 17, 2024 for EP Application No. 23166723, 2 page(s).
EP Office Action Mailed on Jul. 14, 2025 for EP Application No. 24211559, 6 page(s).

\* cited by examiner

*Primary Examiner* — Mark R Gaworecki
(74) *Attorney, Agent, or Firm* — Alston & Bird LLP

(57) ABSTRACT

An example photoionization detector is provided. The example photoionization detector includes an insulation spacer component and a signal collection electrode component disposed on the first surface of the insulation spacer component. In some examples, the signal collection electrode component includes a first electrode layer and a second electrode layer.

17 Claims, 6 Drawing Sheets

PHOTOIONIZATION DETECTOR WITH LAYERED ELECTRODES

CROSS-REFERENCE TO RELATED APPLICATIONS

This application claims priority pursuant to 35 U.S.C. 119(a) to Chinese Application No. 202210414854.9, filed Apr. 20, 2022, which application is incorporated herein by reference in its entirety.

TECHNOLOGICAL FIELD

Embodiments of the present disclosure generally relate to photoionization detectors for detecting the presence of volatile organic compounds (VOCs) and/or the concentration levels of VOCs. In particular, various embodiments of the present disclosure provide example electrode assemblies for photoionization detectors that provide technical benefits and advantages.

BACKGROUND

Applicant has identified many technical challenges and difficulties associated with gas sensors. For example, many gas sensors are plagued with technical issues and difficulties such as, but not limited to, low accuracies and high baseline value.

BRIEF SUMMARY

Various embodiments described herein provide various example photoionization detectors that provide technical advancements and improvements.

In accordance with various embodiments of the present disclosure, an example photoionization detector comprises an insulation spacer component comprising ultraviolet radiation shielding material and a signal collection electrode component disposed on a first surface of the insulation spacer component. In some embodiments, the signal collection electrode component comprises a first electrode layer and a second electrode layer. In some embodiments, the first electrode layer is disposed between the insulation spacer component and the second electrode layer. In some embodiments, a second layer electrode width associated with the second electrode layer is smaller than a first layer electrode width associated with the first electrode layer.

In some embodiments, the first electrode layer defines a plurality of first electrode layer openings. In some embodiments, the first layer electrode width corresponds to a width of the first electrode layer between two of the plurality of first electrode layer openings.

In some embodiments, the second electrode layer defines a plurality of second electrode layer openings. In some embodiments, the second layer electrode width corresponds to a width of the second electrode layer between two of the plurality of second electrode layer openings.

In some embodiments, the example photoionization detector further comprises a bias voltage electrode component disposed on a second surface of the insulation spacer component. In some embodiments, the second surface of the insulation spacer component is opposite to the first surface of the insulation spacer component.

In some embodiments, the signal collection electrode component is applied a signal collection voltage. In some embodiments, the bias voltage electrode component is applied a bias voltage. In some embodiments, the bias voltage is higher than the signal collection voltage.

In some embodiments, the insulation spacer component defines a plurality of insulation spacer openings. In some embodiments, the first electrode layer defines a plurality of first electrode layer openings, and the second electrode layer defines a plurality of second electrode layer openings.

In some embodiments, each of the plurality of insulation spacer openings is aligned with one of the plurality of first electrode layer openings, and each of the plurality of first electrode layer openings is aligned with the one of the plurality of second electrode layer openings.

In some embodiments, each of the plurality of insulation spacer openings is narrower than one of the plurality of first electrode layer openings, and each of the plurality of first electrode layer openings is narrower than one of the plurality of second electrode layer openings.

In some embodiments, the example photoionization detector further comprises an ultraviolet light source. In some embodiments, the insulation spacer component is positioned between the ultraviolet light source and the signal collection electrode component.

In some embodiments, ultraviolet light from the ultraviolet light source does not impinge on the first electrode layer of the signal collection electrode component and does not impinge on the second electrode layer of the signal collection electrode component.

In some embodiments, the signal collection electrode component comprises at least one intermediate electrode layer that is positioned between the first electrode layer and the second electrode layer.

In some embodiments, the at least one intermediate electrode layer defines a plurality of intermediate electrode layer openings, and an intermediate layer electrode width associated with the at least one intermediate electrode layer is smaller than the first layer electrode width and larger than the second layer electrode width.

In some embodiments, the intermediate layer electrode width corresponds to a width of the at least one intermediate electrode layer between two of the plurality of intermediate electrode layer openings.

In some embodiments, the first electrode layer defines a plurality of first electrode layer openings, and the second electrode layer defines a plurality of second electrode layer openings. In some embodiments, the plurality of first electrode layer openings, the plurality of intermediate electrode layer openings, and the plurality of second electrode layer openings are aligned with each other.

In some embodiments, each of the plurality of first electrode layer openings is narrower than one of the plurality of intermediate electrode layer openings, and each of the plurality of intermediate electrode layer openings is narrower than one of the plurality of second electrode layer openings.

In some embodiments, the signal collection electrode component defines a plurality of signal collection electrode openings, and the signal collection electrode component comprises a triangular prism shaped electrode between two of the plurality of signal collection electrode openings. In some embodiments, the insulation spacer component defines a plurality of insulation spacer openings. In some embodiments, each of the plurality of insulation spacer openings is aligned with one of the plurality of signal collection electrode openings.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1A:
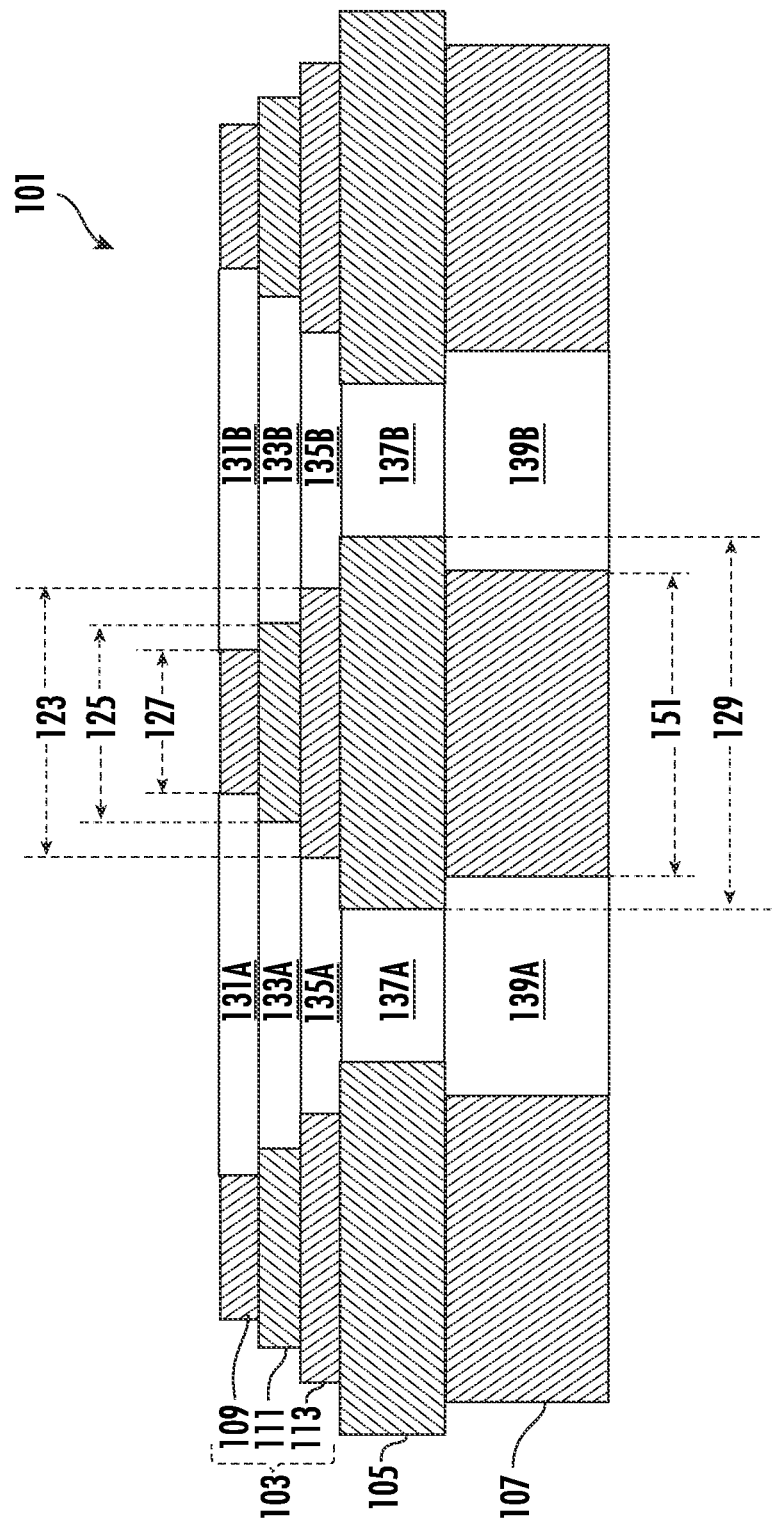
FIG. 1A illustrates an example schematic diagram of an example electrode assembly of an example photoionization detector in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

In the present disclosure, the phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

In the present disclosure, the words "example" or "exemplary" are used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

In the present disclosure, the term "component" refers to one or more separable element(s) or independent unit(s) that may be used to form, construct, or otherwise be part of an example photoionization detector. In some embodiments, a component may comprise one or more physical entities/structures that may provide one or more particular functions to the example photoionization detector.

Various embodiments of the present disclosure provide example photoionization detectors that detect the presence of and/or measure the concentration level of VOCs and/or other gaseous substances. In the present disclosure, the terms "volatile organic compound" or "VOC" refer to organic compounds that have a high vapor pressure at an ordinary room temperature. Example chemicals in VOCs may include, for example, formaldehyde, methane, benzene, and/or the like.

Because VOCs can easily become gas or vapor, a high concentration level of VOCs in indoor air or outdoor air may cause adverse effects on health and environment. As such, photoionization detectors may be utilized to measure and monitor the concentration levels of VOCs in various indoor and/or outdoor locations.

However, there are many technical challenges and difficulties associated with the photoionization detectors.

For example, the performance of many photoionization detectors are adversely impacted due to high baseline values. In the present disclosure, the term "baseline value" refers to a reading value from a photoionization detector that is caused by the photoionization of one or more electrodes of the photoionization detector.

Photoionization occurs when an atom or a molecule is exposed to or absorbs sufficient electromagnetic radiation (such as, but not limited to, ultraviolet light) such that an electron is emitted and/or released from the atom or the molecule, creating a positive ion. An example photoionization detector may comprise an ultraviolet light source that emits ultraviolet light through substances (such as, but not limited to, gaseous substances) that may include VOCs. In such an example, photons from the ultraviolet light may be absorbed by atoms and/or molecules of VOCs in the substance, causing electrons to be emitted or released from VOCs and creating positively charged ions. In some examples, positively charged ions that are produced due to photoionization of VOCs may create an electric current. In such examples, the higher the concentration level of the VOCs, the higher the electric current that is created through the photoionization caused by the ultraviolet light. An example photoionization detector may measure a level of the electric current, and may generate a reading value based on the level of the electric current that is indicative of a concentration level of the VOCs in the substance.

In some embodiments, the example photoionization detector may comprise a pair of electrodes (such as, but not limited to, a bias voltage electrode and a signal collection electrode). The signal collection electrode may be applied a signal collection voltage, and the bias voltage electrode may be applied a bias voltage that is higher than the signal collection voltage. The voltage difference between the bias voltage electrode and the signal collection electrode may cause positively charged ions (produced due to photoionization of VOCs) to be attracted to the signal collection electrode. As such, the example photoionization detector may measure the amount of electric current on the signal collection electrode, and may generate a reading value that at least partially corresponds to the concentration level of VOCs in the substance.

However, many factors may affect the reading values of the photoionization detectors. For example, environmental noise may create unwanted disturbances to the reading values of the photoionization detectors. Environmental noise may be caused by, for example but not limited to, stray electromagnetic radiation, environmental temperature variation, humidity variation, and/or the like.

If there is no VOC in the ambient air, it is supposed that no ion is generated. However, in reality, even if the concentration of VOC is zero, a weak current can still be detected by a signal collection electrode. The signal collected when there is no VOC around is named as "baseline." Baseline can come from several aspects; one main reason is the photoelectric effect on the electrode(s) of the photoionization detector. As described above, the photoionization detector may comprise an ultraviolet light source that emits ultraviolet light. When the electrode(s) of the photoionization detector are exposed to or in contact with the ultraviolet light, photons from the ultraviolet light may cause the material of the electrode(s) (such as, but not limited to, metal) to emit electrons and create positively charged ions. The positively charged ions due to the ionization of the electrode(s) may cause variations or fluctuations of the electric current that is generated due to photoionization of VOCs. As such, photoelectric effect on the electrode(s) of the photoionization detector can adversely impact the performance of photoionization detectors.

As illustrated above, the higher the baseline value, the more interferences that are caused by the photoelectric effect on the electrode(s) of the photoionization detector. A high baseline value can cause the reading values from the photoionization detector to be less accurate indications of the actual concentration levels of the VOCs in the substance.

Many photoionization detectors are also plagued by technical limitations that are due to a low ion collection efficiency. In the present disclosure, the term "ion collection efficiency" refers to a percentage rate of positively charged ions (due to the ionization of VOCs) that are collected by the signal collection electrode of the photoionization detector. If the ion collection efficiency is different when ion concentration is higher, the responding signal will not be linear with concentration of VOC.

In some embodiments, the ion collection efficiency of the photoionization detector may correlate to the size of the surface area of the signal collection electrode that collects ions. The larger the surface area, the more positively charged ions can be collected by the signal collection electrode. However, in many photoionization detectors, the signal collection electrode having a large surface area is also more likely to be directly irradiated by ultraviolet light, and a strong photoelectric effect on the signal collection electrode can increase baseline value of the photoionization detector, which can adversely impact the performance of the photoionization detector.

As such, many photoionization detectors fail to provide a solution that balances the need for a low baseline value (where the surface area of electrode(s) exposed to the ultraviolet light should be as small as possible) and the need for a high ion collection efficiency (where the surface area of electrode(s) for collecting positively charged ions should be as large as possible). As a result of failing to provide such a solution, many photoionization detectors may provide narrow linearity ranges of the reading values from the photoionization detector.

For example, if the surface area of electrode(s) for collecting positively charged ions is too small, the photoionization detector may still collect a sufficient number of positively charged ions when the concentration level of the VOCs is low (and provide a linearity relationship between the concentration levels of the VOCs and the reading values of the photoionization detector), but may not be able to collect a sufficient number of positively charged ions when the concentration level of the VOCs is high (and therefore unable to provide a linearity relationship between the concentration levels of the VOCs and the reading values of the photoionization detector). As another example, if the surface area of electrode(s) is too large, the photoionization of one or more electrodes may cause interferences with the reading values from the photoionization detector, and may distort any linearity relationship between the reading values and the concentration levels of the VOCs. As such, many photoionization detectors suffer from issues of narrow linearity range at the low-end and the high-end.

In contrast, various embodiments of the present disclosure overcome these technical challenges, difficulties, and issues, and provide various technical advancements and improvements. For example, various embodiments of the present disclosure may reduce the baseline value in photoionization detector, increase the ion collection efficiency of photoionization detector, and resolve the narrow linearity range at low-end and high-end issues.

For example, an example photoionization detector in accordance with various embodiments of the present disclosure may comprise a signal collection electrode with layered structure for signal collection. The signal collection electrode may comprise materials such as, but not limited to, metal. In some embodiments, the signal collection electrode is positioned on top of an insulation spacer component so that it is hidden behind the insulation spacer component. In some embodiments, the insulation spacer component may comprise materials such as, but not limited to, polytetrafluoroethylene, PTFE, and/or the like that blocks ultraviolet light. As such, the signal collection electrode cannot be irradiated by the ultraviolet light, which can reduce and/or eliminate the photoelectric effect on the electrodes and can reduce the baseline value of the photoionization detector. Additionally, the layered structure of the signal collection electrode can increase the effective collection area of the signal collection electrode, and therefore increase the ion collection efficiency of the photoionization detector.

As such, various embodiments of the present disclosure provide photoionization detectors with electrode assemblies that can reduce the baseline value of the photoionization detector and improve the signal-noise-ratio (SNR) by avoiding being directly irradiated by ultraviolet light and increasing effective collection area, details of which are described herein.

Figure 1B:
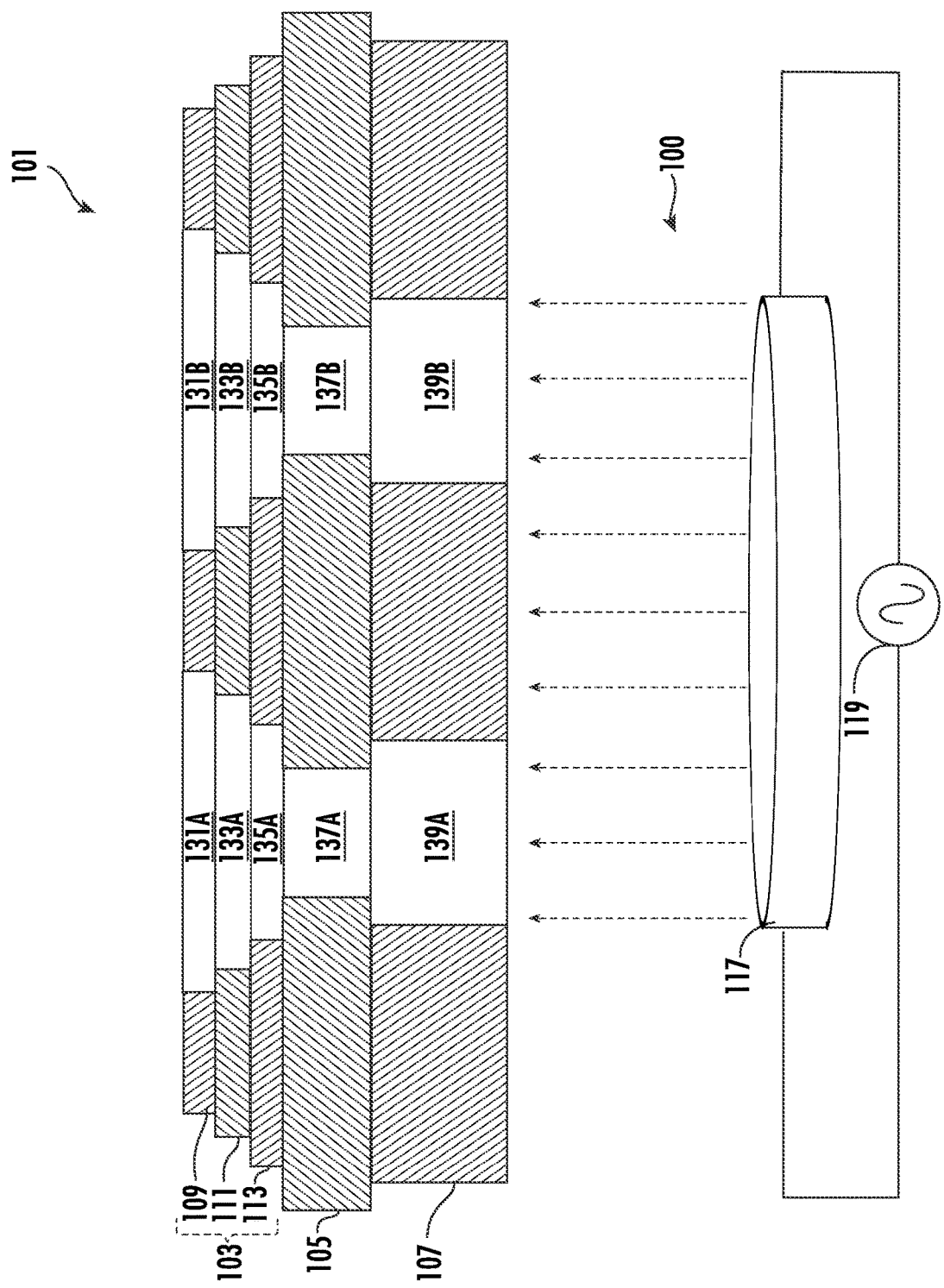
FIG. 1B illustrates an example schematic diagram of an example photoionization detector that includes the example electrode assembly shown in FIG. 1A in accordance with various embodiments of the present disclosure.
Figure 1C:
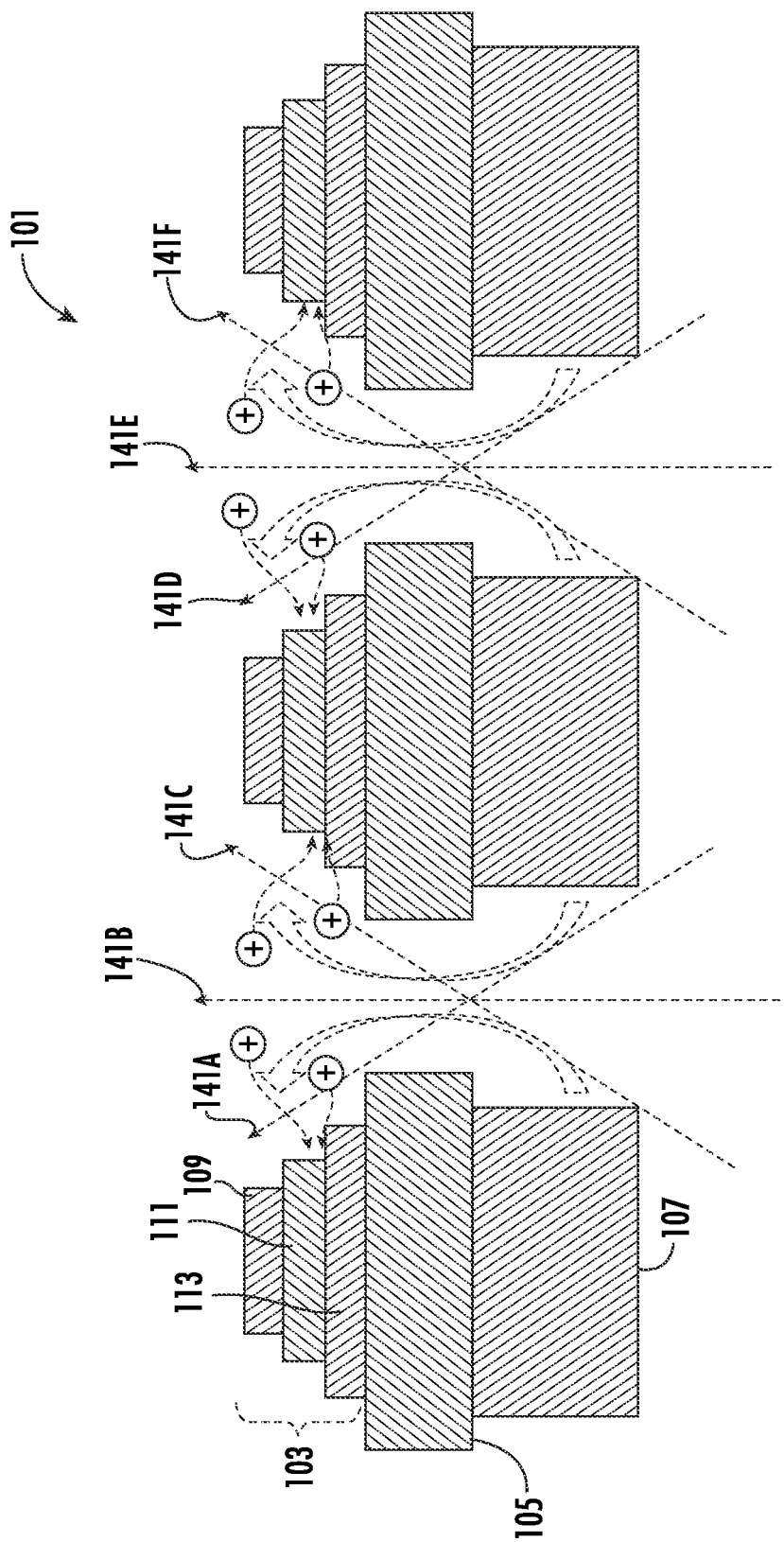
FIG. 1C illustrates another example schematic diagram of the example electrode assembly shown in FIG. 1A and FIG. 1B in accordance with various embodiments of the present disclosure.

Referring now to FIG. 1A, FIG. 1B, and FIG. 1C, example schematic diagrams in accordance with various embodiments of the present disclosure are provided. In particular, FIG. 1A illustrates an example schematic diagram of an example electrode assembly 101 in accordance with various embodiments of the present disclosure. FIG. 1B illustrates an example photoionization detector 100 that includes the electrode assembly 101 shown in FIG. 1A. FIG. 1C illustrates the example electrode assembly 101 shown in FIG. 1A and FIG. 1B, as well as the flow of positively charged ions due the ionization of the VOCs within the example electrode assembly 101.

As described above, an example photoionization detector in accordance with various embodiments of the present disclosure may comprise one or more electrodes (such as, but not limited to, a signal collection electrode and a bias voltage electrode) for measuring electric current generated by positively charged ions due to ionization of VOCs. In some embodiments, an example photoionization detector may comprise an electrode assembly that comprises the one or more electrodes of the example photoionization detector (including, but not limited to, the signal collection electrode and the bias voltage electrode).

In the example illustrated in FIG. 1A and FIG. 1B, the electrode assembly 101 comprises an insulation spacer component 105. Because the electrode assembly 101 is a part of the example photoionization detector 100, the example photoionization detector 100 comprises the insulation spacer component 105.

In the present disclosure, the term "insulation spacer component" refers to a component, a part, and/or an element that may separate two or more other components, parts, and/or elements from each other, and insulate/protect one or more other components, parts, and/or elements from ultraviolet radiation. For example, the insulation spacer component 105 comprises materials such as, but not limited to, ultraviolet radiation shielding material.

In the present disclosure, "ultraviolet radiation shielding material" refers to materials that can block ultraviolet light and/or shield other objects from ultraviolet light. Examples of ultraviolet radiation shielding material comprise, but not limited, polytetrafluoroethylene, PTFE, Teflon, and/or the like.

In some embodiments, the insulation spacer component 105 defines a plurality of insulation spacer openings. In the example shown in FIG. 1A, the insulation spacer component 105 defines an insulation spacer opening 137A and an insulation spacer opening 137B. In some embodiments, the plurality of insulation spacer openings provide apertures and/or gaps that allow substances and ultraviolet light to pass through.

For example, as illustrated in FIG. 1B, the example photoionization detector may comprise an ultraviolet light source 117 that is positioned under the insulation spacer component 105. The ultraviolet light source 117 may emit ultraviolet light through the plurality of insulation spacer openings (including the insulation spacer opening 137A and the insulation spacer opening 137B).

In some embodiments, the example photoionization detector 100 shown in FIG. 1B may receive gaseous substances from the top of the example photoionization detector 100. As such, gaseous substances may flow from a top end of the plurality of insulation spacer openings (including a top end of the insulation spacer opening 137A and a top end of the insulation spacer opening 137B) to a bottom end of the plurality of insulation spacer openings (including a bottom end of the insulation spacer opening 137A and a bottom end of the insulation spacer opening 137B, respectively). In some embodiments, ionization of VOCs in the gaseous substances may occur when the VOCs are exposed to the ultraviolet light emitted by the ultraviolet light source 117 in the plurality of insulation spacer openings (including the insulation spacer opening 137A and the insulation spacer opening 137B), details of which are described and illustrated in connection with at least FIG. 1C.

Referring back to FIG. 1A, in some embodiments, the insulation spacer component 105 is associated with an insulation spacer width 129. In some embodiments, the insulation spacer width 129 corresponds to a width of the insulation spacer component 105 between two of the plurality of insulation spacer openings (such as, but not limited to, the insulation spacer opening 137A and the insulation spacer opening 137B). In the example shown in FIG. 1A, the insulation spacer width 129 corresponds to a width of the insulation spacer component 105 between the insulation spacer opening 137A and the insulation spacer opening 137B.

In some embodiments, the electrode assembly 101 comprises a signal collection electrode component 103 that is disposed on a first surface of the insulation spacer component 105. Because the electrode assembly 101 is a part of the example photoionization detector 100, the example photoionization detector 100 comprises the signal collection electrode component 103. In some embodiments, the first surface of the insulation spacer component 105 is a top surface of the insulation spacer component 105. As such, the signal collection electrode component 103 is also referred to as a top electrode component.

In the present disclosure, the term "electrode component" or "electrode" refers to an electrical conductor that is connected to a power source (for example, through one or more switches) and may comprise a surface that contacts nonmetallic substances, materials, and/or the like (such as, but not limited to, air, gaseous substances, ultraviolet light, and/or the like).

In some embodiments, the signal collection electrode component 103 may collect positively charged ions due to ionization of the VOCs in the gaseous substance as described above. In some embodiments, the signal collection electrode component 103 may comprise materials such as, but not limited to, metal (e.g., steel, nickel, copper, and/or the like).

In the example shown in FIG. 1A, the signal collection electrode component 103 comprises one or more electrode layers. In some embodiments, the one or more electrode layers may be stacked on top of one another, such that the one or more electrode layers together form the signal collection electrode component 103. In some embodiments, the signal collection electrode component 103 is stepped shaped (e.g. comprising a series of successively receding electrode layers).

In some embodiments, each electrode layer comprises one or more electrode layer openings. In some embodiments, one or more electrode layer openings provide apertures and/or gaps that allow substances and ultraviolet light to pass through. For example, each electrode layer opening may be aligned with electrode layer opening(s) from other electrode layer(s), such that the electrode layer openings from different electrode layers form a plurality of signal collection electrode openings.

For example, as illustrated in FIG. 1A, the signal collection electrode component 103 may comprise a first electrode layer 113 and a second electrode layer 109.

In some embodiments, the first electrode layer 113 of the signal collection electrode component 103 is disposed on a first surface of the insulation spacer component 105. For example, the first surface of the insulation spacer component 105 may correspond to a top surface of the insulation spacer component 105. In such an example, a bottom surface of the first electrode layer 113 of the signal collection electrode component 103 is in contact with the first surface (e.g. the top surface) of the insulation spacer component 105.

In some embodiments, the first electrode layer 113 defines a plurality of first electrode layer openings. In the example shown in FIG. 1A, the first electrode layer 113 defines a first electrode layer opening 135A and a first electrode layer opening 135B. In some embodiments, the plurality of first electrode layer openings provide apertures and/or gaps that allow substances and ultraviolet light to pass through.

As described above and further illustrated in FIG. 1B, the example photoionization detector 100 may comprise the ultraviolet light source 117. In some embodiments, the insulation spacer component 105 is positioned between the ultraviolet light source 117 and the signal collection electrode component 103. For example, the ultraviolet light source 117 is positioned under the insulation spacer component 105, and the first electrode layer 113 is disposed on top of the insulation spacer component 105. In such an example, the ultraviolet light source 117 is also positioned under the first electrode layer 113 and may emit ultraviolet light through the plurality of first electrode layer openings (including the first electrode layer opening 135A and the first electrode layer opening 135B).

As described above, the example photoionization detector 100 shown in FIG. 1B may receive gaseous substances from the top of the example photoionization detector 100. As such, gaseous substances may flow from a top end of the plurality of first electrode layer openings (including the first electrode layer opening 135A and the first electrode layer opening 135B) to a bottom end of the plurality of first electrode layer openings (including the first electrode layer opening 135A and the first electrode layer opening 135B, respectively). In some embodiments, ionization of VOCs in the gaseous substances may occur in the plurality of first electrode layer openings (including the first electrode layer opening 135A and the first electrode layer opening 135B) when the VOCs are exposed to the ultraviolet light emitted by the ultraviolet light source 117, details of which are described and illustrated in connection with at least FIG. 1C.

Referring back to FIG. 1A, in some embodiments, the first electrode layer 113 is associated with a first layer electrode width 123. In some embodiments, the first layer electrode width 123 corresponds to a width of the first electrode layer 113 between two of the plurality of first electrode layer openings (such as, but not limited to, the first electrode layer opening 135A and the first electrode layer opening 135B). For example, the first layer electrode width 123 corresponds to a width of the first electrode layer 113 between the first electrode layer opening 135A and the first electrode layer opening 135B. In some embodiments, the portion of the first electrode layer 113 that is between two of the plurality of first electrode layer openings is referred to as a first electrode.

In some embodiments, the first electrode layer 113 of the signal collection electrode component 103 is disposed between the insulation spacer component 105 and the second electrode layer 109 of the signal collection electrode component 103. For example, the second electrode layer 109 of the signal collection electrode component 103 is positioned above the first electrode layer 113. As shown in FIG. 1A, because the first electrode layer 113 is positioned above the insulation spacer component 105, the second electrode layer 109 is also positioned above the insulation spacer component 105.

In some embodiments, the second electrode layer 109 defines a plurality of second electrode layer openings. In the example shown in FIG. 1A, the second electrode layer 109 defines a second electrode layer opening 131A and a second electrode layer opening 131B. In some embodiments, the plurality of second electrode layer openings provide apertures and/or gaps that allow substances and ultraviolet light to pass through.

As described above and further illustrated in FIG. 1B, the example photoionization detector 100 may comprise the ultraviolet light source 117. For example, the ultraviolet light source 117 is positioned under the insulation spacer component 105, and the second electrode layer 109 is positioned above the insulation spacer component 105. In such an example, the ultraviolet light source 117 is also positioned under the second electrode layer 109 and may emit ultraviolet light through the plurality of second electrode layer openings (including the second electrode layer opening 131A and the second electrode layer opening 131B).

As described above, the example photoionization detector 100 shown in FIG. 1B may receive gaseous substances from the top of the example photoionization detector 100. For example, gaseous substances may flow from a top end of the plurality of second electrode layer openings (including the second electrode layer opening 131A and the second electrode layer opening 131B) to a bottom end of the plurality of second electrode layer openings (including the second electrode layer opening 131A and the second electrode layer opening 131B, respectively). In some embodiments, ionization of VOCs in the gaseous substances may occur in the plurality of second electrode layer openings (including the second electrode layer opening 131A and the second electrode layer opening 131B) when the VOCs are exposed to the ultraviolet light emitted by the ultraviolet light source 117, details of which are described and illustrated in connection with at least FIG. 1C.

Referring back to FIG. 1A, in some embodiments, the second electrode layer 109 is associated with a second layer electrode width 127. In some embodiments, the second layer electrode width 127 corresponds to a width of the second electrode layer 109 between two of the plurality of second electrode layer openings (such as, but not limited to, the second electrode layer opening 131A and the second electrode layer opening 131B). In the example shown in FIG. 1A, the second layer electrode width 127 corresponds to a width of the second electrode layer 109 between the second electrode layer opening 131A and the second electrode layer opening 131B. In some embodiments, the portion of the second electrode layer 109 that is between two of the plurality of second electrode layer openings is referred to as a second electrode.

In some embodiments, the signal collection electrode component 103 may comprise two electrode layers, such as the first electrode layer 113 and the second electrode layer 109. In some embodiments, the signal collection electrode component 103 may comprise more than two electrode layers. For example, as shown in FIG. 1A, the signal collection electrode component 103 comprises at least one intermediate electrode layer (such as, but not limited to, the intermediate electrode layer 111) that is positioned between the first electrode layer 113 and the second electrode layer 109. For example, the intermediate electrode layer 111 is disposed between a top surface of the first electrode layer 113 and a bottom surface of the second electrode layer 109. In such an example, the first electrode layer 113 is secured to a bottom surface of the intermediate electrode layer 111, and the second electrode layer 109 is secured to a top surface of the intermediate electrode layer 111.

In some embodiments, each of the at least one intermediate electrode layer defines a plurality of intermediate electrode layer openings. In the example shown in FIG. 1A, the intermediate electrode layer 111 defines an intermediate electrode layer opening 133A and an intermediate electrode layer opening 133B. In some embodiments, the plurality of intermediate electrode layer openings provide apertures and/or gaps that allow substances and ultraviolet light to pass through.

In some embodiments, the at least one intermediate electrode layer (such as, but not limited to, the intermediate electrode layer 111) is positioned above the first electrode layer 113, which in turn is positioned above the insulation spacer component 105. As such, the at least one intermediate electrode layer (such as, but not limited to, the intermediate electrode layer 111) is also positioned above the insulation spacer component 105.

As described above and further illustrated in FIG. 1B, the example photoionization detector 100 may comprise the ultraviolet light source 117 that is positioned under the insulation spacer component 105. Because the at least one intermediate electrode layer (such as, but not limited to, the intermediate electrode layer 111) is positioned above the insulation spacer component 105, the ultraviolet light source 117 is also positioned under the at least one intermediate electrode layer (such as, but not limited to, the intermediate electrode layer 111) and may emit ultraviolet light through the plurality of intermediate electrode layer openings (including the intermediate electrode layer opening 133A and the intermediate electrode layer opening 133B).

As described above, the example photoionization detector 100 shown in FIG. 1B may receive gaseous substances from the top of the example photoionization detector 100. As such, gaseous substances may flow from a top end of the plurality of intermediate electrode layer openings (including the intermediate electrode layer opening 133A and the intermediate electrode layer opening 133B) to a bottom end of the plurality of intermediate electrode layer openings (including the intermediate electrode layer opening 133A and the intermediate electrode layer opening 133B, respectively). In some embodiments, ionization of VOCs in the gaseous substances may occur in the plurality of intermediate electrode layer openings (including the intermediate electrode layer opening 133A and the intermediate electrode layer opening 133B) when the VOCs are exposed to the ultraviolet light emitted by the ultraviolet light source 117, details of which are described and illustrated in connection with at least FIG. 1C.

Referring back to FIG. 1A, in some embodiments, the intermediate electrode layer 111 is associated with an intermediate layer electrode width 125. In some embodiments, the intermediate layer electrode width 125 corresponds to a width of the at least one intermediate electrode layer (such as, but not limited to, the intermediate electrode layer 111) between two of the plurality of intermediate electrode layer openings (such as, but not limited to, the intermediate electrode layer opening 133A and the intermediate electrode layer opening 133B). In the example shown in FIG. 1A, the intermediate layer electrode width 125 corresponds to a width of the intermediate electrode layer 111 between the intermediate electrode layer opening 133A and the intermediate electrode layer opening 133B. In some embodiments, a portion of the at least one intermediate electrode layer (such as, but not limited to, the intermediate electrode layer 111) that is between two of the plurality of intermediate electrode layer openings is referred to as an intermediate electrode.

In some embodiments, the first electrode, the intermediate electrode, and the second electrode are aligned with one another. For example, a central axis of the first electrode, a central axis of the intermediate electrode, and a central axis of the second electrode overlap with one another.

In some embodiments, the electrode assembly 101 comprises a bias voltage electrode component 107. In some embodiments, the bias voltage electrode component 107 may comprise materials such as, but not limited to, metal (e.g., steel, nickel, copper, and/or the like).

In some embodiments, the bias voltage electrode component 107 is disposed on a second surface of the insulation spacer component 105. In some embodiments, the second surface of the insulation spacer component 105 is opposite to the first surface of the insulation spacer component 105. As described above, the first surface of the insulation spacer component 105 may correspond to a top surface of the insulation spacer component 105. The second surface of the insulation spacer component 105 may correspond to a bottom surface of the insulation spacer component 105. In such an example, a top surface of the bias voltage electrode component 107 contacts the second surface (e.g. the bottom surface) of the insulation spacer component 105.

In some embodiments, the bias voltage electrode component 107 defines a plurality of bias voltage electrode openings. In the example shown in FIG. 1A, the bias voltage electrode component 107 defines a bias voltage electrode opening 139A and a bias voltage electrode opening 139B. In some embodiments, the plurality of bias voltage electrode openings provide apertures and/or gaps that allow substances and ultraviolet light to pass through.

As described above and further illustrated in FIG. 1B, the example photoionization detector 100 may comprise the ultraviolet light source 117 that is positioned under the bias voltage electrode component 107. In such examples, the bias voltage electrode component 107 is positioned between the ultraviolet light source 117 and the insulation spacer component 105. As shown in FIG. 1B, the ultraviolet light source 117 may emit ultraviolet light through the plurality of bias voltage electrode openings (including the bias voltage electrode opening 139A and the bias voltage electrode opening 139B).

As described above, the example photoionization detector 100 shown in FIG. 1B may receive gaseous substances from the top of the example photoionization detector 100. As such, gaseous substances may flow from a top end of the plurality of bias voltage electrode openings (including the bias voltage electrode opening 139A and the bias voltage electrode opening 139B) to a bottom end of the plurality of bias voltage electrode openings (including the bias voltage electrode opening 139A and the bias voltage electrode opening 139B). In some embodiments, ionization of VOCs in the gaseous substances may occur in the plurality of bias voltage electrode openings (including the bias voltage electrode opening 139A and the bias voltage electrode opening 139B) when the VOCs are exposed to the ultraviolet light emitted by the ultraviolet light source 117, details of which are described and illustrated in connection with at least FIG. 1C.

Referring back to FIG. 1A, in some embodiments, the bias voltage electrode component 107 is associated with a bias voltage electrode width 151. In some embodiments, the bias voltage electrode width 151 corresponds to a width of the bias voltage electrode component 107 between two of the plurality of bias voltage electrode openings (including the bias voltage electrode opening 139A and the bias voltage electrode opening 139B). In the example shown in FIG. 1A, the bias voltage electrode width 151 corresponds to a width of the bias voltage electrode component 107 between the bias voltage electrode opening 139A and the bias voltage electrode opening 139B. In some embodiments, a portion of the bias voltage electrode component 107 that is between two of the plurality of bias voltage electrode openings is referred to as a bias voltage electrode.

Referring now to FIG. 1B, an example photoionization detector 100 that comprises the electrode assembly 101 shown in FIG. 1A is illustrated.

As described above, the example photoionization detector 100 comprises an ultraviolet light source 117 that is positioned under the electrode assembly 101. For example, the ultraviolet light source 117 is positioned under the bias voltage electrode component 107 (e.g. under the insulation spacer component 105 and the signal collection electrode component 103).

In some embodiments, the ultraviolet light source 117 is connected to a power source 119.

In some embodiments, the ultraviolet light source 117 may be in the form of, such as but not limited to, an ultraviolet light lamp, an ultraviolet light bulb, and/or the like. In some embodiments, the power source 119 may be in the form of, such as but not limited to, one or more driving electrodes that provides driving voltages to the ultraviolet light source 117. For example, the power source 119 may be in the form of a high voltage and high frequency power source that are connected to a pair of high voltage drive electrodes. In some embodiments, the pair of high voltage drive electrodes provide power to the ultraviolet light source 117. In some embodiments, the ultraviolet light source 117 may be connected to one or more switches that enable the ultraviolet light source 117 to be turned on and off.

In some embodiments, the ultraviolet light source 117 is positioned such that it emits ultraviolet light through the openings of the bias voltage electrode component 107, the openings of the insulation spacer component 105, and the openings of the signal collection electrode component 103.

For example, as described above in connection with the at least FIG. 1A, the signal collection electrode component 103 comprises a first electrode layer 113, an intermediate electrode layer 111, and a second electrode layer 109. As described above, each of the first electrode layer 113, the intermediate electrode layer 111, and the second electrode layer 109 may comprise one or more openings.

For example, the second electrode layer 109 may comprise one or more second electrode layer openings such as, but not limited to, the second electrode layer opening 131A and the second electrode layer opening 131B. The intermediate electrode layer 111 may comprise one or more intermediate electrode layer openings such as, but not limited to, the intermediate electrode layer opening 133A and the intermediate electrode layer opening 133B. The first electrode layer 113 may comprise one or more first electrode layer openings such as, but not limited to, the first electrode layer opening 135A and the first electrode layer opening 135B.

Similarly, the insulation spacer component 105 comprises one or more insulation spacer openings such as, but not limited to, the insulation spacer opening 137A and the insulation spacer opening 137B. Similarly, the bias voltage electrode component 107 comprises one or more bias voltage electrode openings, such as, but not limited to, the bias voltage electrode opening 139A and the bias voltage electrode opening 139B.

In some embodiments, the plurality of second electrode layer openings (such as, but not limited to, the second electrode layer opening 131A and the second electrode layer opening 131B), the plurality of intermediate electrode layer openings (such as, but not limited to, the intermediate electrode layer opening 133A and the intermediate electrode layer opening 133B), and the plurality of first electrode layer openings (such as, but not limited to, the first electrode layer opening 135A and the first electrode layer opening 135B) are aligned with each other.

For example, each of plurality of second electrode layer openings (such as, but not limited to, the second electrode layer opening 131A and the second electrode layer opening 131B) is aligned with one of the plurality of intermediate electrode layer openings (such as, but not limited to, the intermediate electrode layer opening 133A and the intermediate electrode layer opening 133B).

In some embodiments, each of plurality of intermediate electrode layer openings (such as, but not limited to, the intermediate electrode layer opening 133A and the intermediate electrode layer opening 133B) is aligned with one of the first electrode layer openings (such as, but not limited to, the first electrode layer opening 135A and the first electrode layer opening 135B).

In some embodiments, each of the plurality of insulation spacer openings (such as, but not limited to, the insulation spacer opening 137A and the insulation spacer opening 137B) is aligned with one of the plurality of first electrode layer openings (such as, but not limited to, the first electrode layer opening 135A and the first electrode layer opening 135B).

In some embodiments, each of the plurality of first electrode layer openings (such as, but not limited to, the first electrode layer opening 135A and the first electrode layer opening 135B) is aligned with the one of the plurality of second electrode layer openings (such as, but not limited to, the second electrode layer opening 131A and the second electrode layer opening 131B).

In the present disclosure, when two or more openings are aligned with one another, the central axes of the two or more openings overlap with one another.

For example, as shown in FIG. 1A and FIG. 1B, the second electrode layer opening 131A, the intermediate electrode layer opening 133A, the first electrode layer opening 135A, the insulation spacer opening 137A, and bias voltage electrode opening 139A are aligned with one another. Similarly, the second electrode layer opening 131B, the intermediate electrode layer opening 133B, the first electrode layer opening 135B, the insulation spacer opening 137B, and bias voltage electrode opening 139B are aligned with one another. Aligning such openings with one another can provide technical benefits such as, but not limited to, allowing the gaseous substance to flow from a top of the electrode assembly 101 to a bottom of the electrode assembly 101, while also allowing the ultraviolet light to travel from a bottom of the electrode assembly 101 to a top of the electrode assembly 101, such that the ultraviolet light can cause ionization of the VOCs in the gaseous substance.

As described above, many photoionization detectors are faced with many technical challenges and difficulties, such as, but not limited to, high baseline values and low ion collection efficiency. Various embodiments of the present disclosure overcome these technical challenges and difficulties, and provide various technical improvements.

For example, as shown in FIG. 1A and FIG. 1B, the second layer electrode width 127 associated with the second electrode layer 109 is smaller than a first layer electrode width 123 associated with the first electrode layer 113, which can reduce baseline values and increase ion collection efficiency. Similarly, the intermediate layer electrode width 125 associated with the at least one intermediate electrode layer (such as, but not limited to, the intermediate electrode layer 111) is smaller than the first layer electrode width 123 and larger than the second layer electrode width 127, which can reduce baseline values and increase ion collection efficiency. Similarly, the insulation spacer width 129 associated with the insulation spacer component 105 is larger than the first layer electrode width 123 associated with the first electrode layer 113 and the bias voltage electrode width 151 associated with the bias voltage electrode component 107, which can reduce baseline values and increase ion collection efficiency.

Referring now to FIG. 1C, an example diagram illustrating positively charged ions due to ionizations of VOCs is provided.

As shown in FIG. 1C, the ultraviolet light may be emitted from the bottom of the electrode assembly 101 and may travel through the openings of bias voltage electrode component 107, the openings of the insulation spacer component 105, and the openings of the signal collection electrode component 103 (including the openings of the first electrode layer 113, the openings of the intermediate electrode layer 111, and the openings of the second electrode layer 109). For example, the arrow 141A, the arrow 141B, the arrow 141C, the arrow 141D, the arrow 141E, and the arrow 141F indicate directions where the ultraviolet light may travel.

As described above, the second layer electrode width 127 associated with the second electrode layer 109 is smaller than a first layer electrode width 123 associated with the first electrode layer 113. In some embodiments, the intermediate layer electrode width 125 associated with the at least one intermediate electrode layer (such as, but not limited to, the intermediate electrode layer 111) is smaller than the first layer electrode width 123 and larger than the second layer electrode width 127. In some embodiments, the second layer electrode width 127 is smaller than the intermediate layer electrode width 125, and the intermediate layer electrode width 125 is smaller than the first layer electrode width 123. In some embodiments, the insulation spacer width 129 is larger than the first layer electrode width 123.

In other words, each of the plurality of insulation spacer openings (such as, but not limited to, the insulation spacer opening 137A and the insulation spacer opening 137B) is narrower than one of the plurality of first electrode layer openings (such as, but not limited to, the first electrode layer opening 135A and the first electrode layer opening 135B). In some embodiments, each of the plurality of first electrode layer openings (such as, but not limited to, the first electrode layer opening 135A and the first electrode layer opening 135B) is narrower than one of the plurality of intermediate electrode layer openings (such as, but not limited to, the intermediate electrode layer opening 133A and the intermediate electrode layer opening 133B). In some embodiments, each of the plurality of intermediate electrode layer openings (such as, but not limited to, the intermediate electrode layer opening 133A and the intermediate electrode layer opening 133B) is narrower than one of the plurality of second electrode layer openings (such as, but not limited to, the second electrode layer opening 131A and the second electrode layer opening 131B).

As described above, the sizes of and/or the size relationships between the second layer electrode width, the intermediate layer electrode width, the first layer electrode width, and/or the insulation spacer width can provide various technical benefits and advantages, including, but not limited to, reducing the baseline value and increasing the ion collection efficiency.

For example, as shown in FIG. 1C, a beam of ultraviolet light indicated by the arrow 141A may travel through an insulation spacer opening at an acute angle between the arrow 141A and the first surface of the insulation spacer component 105 (e.g. the top surface of the insulation spacer component 105). As described above, the first electrode layer 113 is disposed on the first surface of the insulation spacer component 105. Because the first layer electrode width 123 of the first electrode layer 113 is smaller than the insulation spacer width 129 of the insulation spacer component 105, the ultraviolet light does not impinge on the first electrode layer 113 of the signal collection electrode component 103. As such, the electrode of the first electrode layer 113 of the signal collection electrode component 103 is not exposed to ultraviolet light, thereby decreasing the baseline value of the example photoionization detector 100.

Similarly, the beam of ultraviolet light indicated by the arrow 141A may continue traveling at the acute angle to the height of the intermediate electrode layer 111. As described above, the intermediate electrode layer 111 is disposed on a top surface of the first electrode layer 113. Because the intermediate layer electrode width 125 of the intermediate electrode layer 111 is smaller than the first layer electrode width 123 of the first electrode layer 113, the ultraviolet light does not impinge on the intermediate electrode layer 111 of the signal collection electrode component 103. As such, the electrode of the intermediate electrode layer 111 of the signal collection electrode component 103 is not exposed to ultraviolet light, thereby decreasing the baseline value of the example photoionization detector 100.

Similarly, the beam of ultraviolet light indicated by the arrow 141A may continue traveling at the acute angle to the height of the second electrode layer 109. As described above, the second electrode layer 109 is disposed on a top surface of the intermediate electrode layer 111. Because the second layer electrode width 127 of the second electrode layer 109 is smaller than the intermediate layer electrode width 125 of the intermediate electrode layer 111, the ultraviolet light does not impinge on the second electrode layer 109 of the signal collection electrode component 103. As such, the electrode of the second electrode layer 109 of the signal collection electrode component 103 is not exposed to ultraviolet light, thereby decreasing the baseline value of the example photoionization detector 100.

As such, the ultraviolet light does not impinge on the signal collection electrode component 103 (e.g. the electrode of the signal collection electrode component 103 is not exposed to ultraviolet light), thereby decreasing the baseline value of the example photoionization detector 100.

While the description above provides an example of one intermediate electrode layer, it is noted that the scope of the present disclosure is not limited to the description above. In some examples, an example electrode assembly may comprise more than one intermediate electrode layer that is positioned between the first electrode layer 113 and the second electrode layer 109, forming an intermediate electrode layer stack. In such examples, intermediate electrode layers in the intermediate electrode layer stack are stacked on top of one another. The higher an intermediate electrode layer is stacked in the intermediate electrode layer stack, the smaller the intermediate layer electrode width of that intermediate electrode layer. In some embodiments, the intermediate layer electrode width of the highest stacked intermediate electrode layer is larger than the second layer electrode width. In some embodiments, the intermediate layer electrode width of the lowest stacked intermediate electrode layer is smaller than the first layer electrode width. In other words, the intermediate electrode layer stack comprises a series of successively receding intermediate electrode layers. In such examples, the ultraviolet light does not impinge on the intermediate electrode layer stack (e.g. the electrode of the intermediate electrode layer stack is not exposed to ultraviolet light), thereby decreasing the baseline value of the example photoionization detector 100.

Further, as illustrated in FIG. 1C, the layered structure of the signal collection electrode component 103 can increase the ion collection efficiency.

In some embodiments, the signal collection electrode component 103 (including the second electrode layer 109, the intermediate electrode layer 111, and the first electrode layer 113) may receive a signal collection voltage. For example, the signal collection electrode component 103 may be connected to a power source that applies the signal collection voltage to the signal collection electrode component 103. Similarly, the bias voltage electrode component 107 may receive a bias voltage. For example, the bias voltage electrode component 107 may be connected to a power source that applies the bias voltage to the bias voltage electrode component 107.

In some embodiments, the bias voltage is higher than the signal collection voltage. In some embodiments, the bias voltage is 75 volts and the signal collection voltage is 2 volts. In some embodiments, the bias voltage and/or the signal collection voltage may be lower or higher than the example above.

In some embodiments, because the bias voltage is higher than the signal collection voltage, the signal collection electrode component 103 and the bias voltage electrode component 107 create an electric field that attracts positively charged particles to the signal collection electrode component 103 and negatively charged particles to the bias voltage electrode component 107.

As described above in connection with at least FIG. 1B, the ultraviolet light source 117 is positioned under the electrode assembly 101 and provides ultraviolet light to cause ionization of VOCs in the gaseous substance. For example, the ultraviolet light from the ultraviolet light source 117 travels through the plurality of bias voltage electrode openings (such as, but not limited to, the bias voltage electrode opening 139A and the bias voltage electrode opening 139B), through the plurality of insulation spacer openings (such as, but not limited to, the insulation spacer opening 137A and the insulation spacer opening 137B), through the plurality of first electrode layer openings (such as, but not limited to, the first electrode layer opening 135A and the first electrode layer opening 135B), through the plurality of intermediate electrode layer openings (such as, but not limited to, the intermediate electrode layer opening 133A and the intermediate electrode layer opening 133B), and through the plurality of second electrode layer openings (such as, but not limited to, the second electrode layer opening 131A and the second electrode layer opening 131B).

In some embodiments, ionization of VOCs in the gaseous substance may happen in the openings of bias voltage electrode component 107, the openings of the insulation spacer component 105, and/or the openings of the signal collection electrode component 103 (including the openings of the second electrode layer 109, the openings of the intermediate electrode layer 111, and the openings of the first electrode layer 113). The ionization of VOCs causes electrons to be emitted or released from VOCs and creates positively charged ions, and the positively charged ions are attracted to the surface of the signal collection electrode component 103.

As shown in FIG. 1C, the surface of the signal collection electrode component 103 that collects positively charged ions include not only the side surface of the second electrode layer 109, the side surface of the intermediate electrode layer 111, and the side surface of the first electrode layer 113, but also the exposed top surface of the intermediate electrode layer 111 and the exposed top surface of the first electrode layer 113.

In particular, because the second layer electrode width is smaller than the intermediate layer electrode width, a part of the top surface of the intermediate electrode layer 111 is exposed to collect the positively charged ions due to the ionizations of the VOCs. Similarly, because the intermediate electrode width is smaller than the first layer electrode width, a part of the top surface of the first electrode layer 113 is exposed to collect the positively charged ions due to the ionizations of the VOCs. As such, the collection surface of the signal collection electrode component 103 that collects positively charged ions due to the ionization of the VOCs resembles that of a series of stairs, and the size of the collection surface of the signal collection electrode component 103 that collects positively charged ions is higher than that of a signal collection electrode component without a layered structure. As described above, the ion collection efficiency of a photoionization detector may correlate to the size of the surface area of the signal collection electrode that collects ions. As such, various examples of the present disclosure may increase the ion collection efficiency.

Because the ion collection efficiency is increased when example embodiments of the present disclosure are implemented, most or all positively charged ions due to the ionization of the VOCs can be collected by the signal collection electrode component 103. As such, various examples of the present disclosure overcome issues of narrow linearity ranges of the reading values from the photoionization detector.

Referring back to FIG. 1C, the bias voltage electrode width of the bias voltage electrode component 107 is smaller than the insulation spacer width of the insulation spacer component 105. In other words, each of the plurality of bias voltage electrode openings (such as, but not limited to, the bias voltage electrode opening 139A and the bias voltage electrode opening 139B) is wider than one of the plurality of insulation spacer openings (such as, but not limited to, the insulation spacer opening 137A and the insulation spacer opening 137B).

In some embodiments, the sizes of and/or the size relationships between the bias voltage electrode width and the insulation spacer width can provide various technical benefits and advantages, including, but not limited to, reducing the baseline value and increasing the ion collection efficiency. For example, because the bias voltage electrode width is smaller than the insulation spacer width, the ultraviolet light can travel at acute angles as shown by the arrow 141A, the arrow 141C, the arrow 141D, and/or the arrow 141F in FIG. 1C, which can increase the amount of the ionization of the VOCs in the gaseous substance and increase the accuracy of reading values of the example photoionization detector 100.

Figure 2:
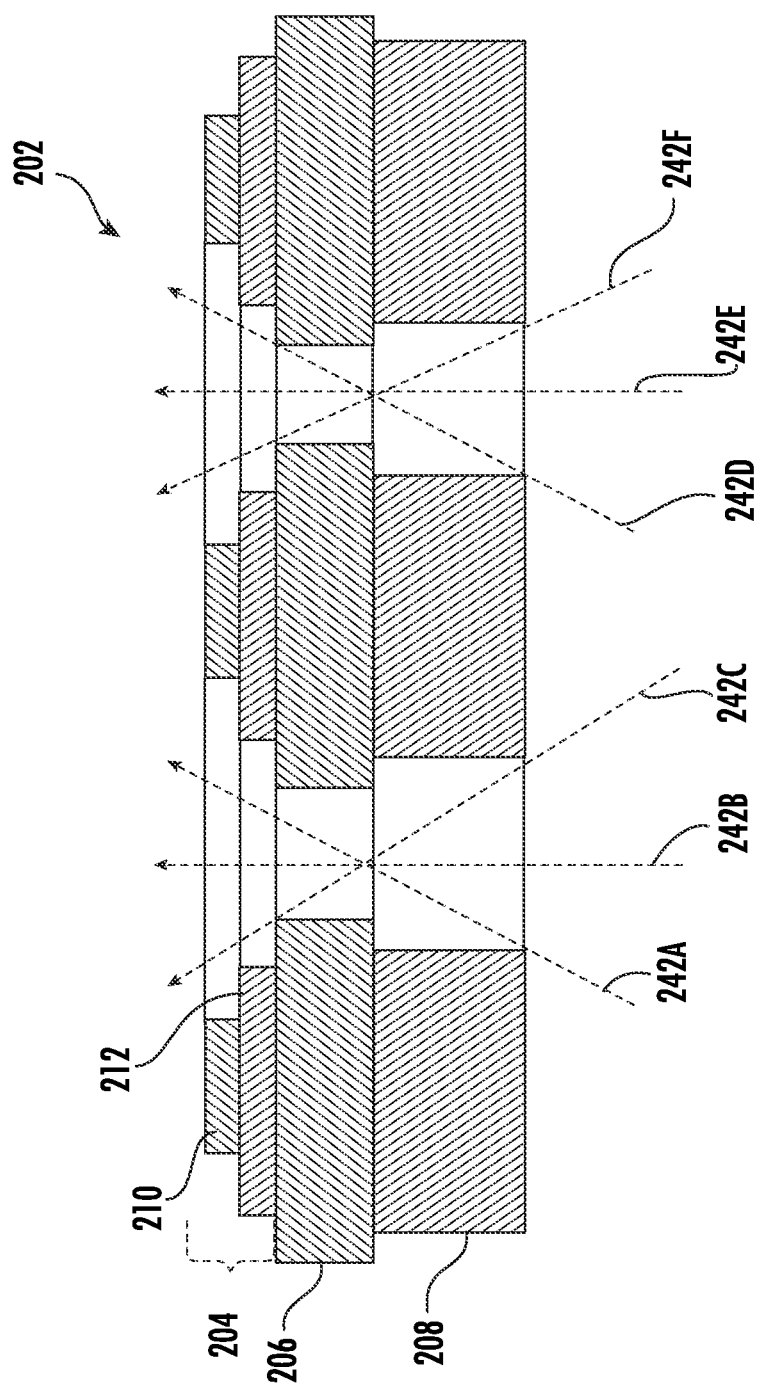
FIG. 2 illustrates an example schematic diagram of an example electrode assembly of an example photoionization detector in accordance with various embodiments of the present disclosure.

Referring now to FIG. 2, an example schematic diagram of an example electrode assembly 202 for an example photoionization detector in accordance with various embodiments of the present disclosure is illustrated.

In the example shown in FIG. 2, the example electrode assembly 202 comprises an insulation spacer component 206, similar to the example insulation spacer component 105 described above in connection with FIG. 1A, FIG. 1B, and FIG. 1C. For example, the example insulation spacer component 105 may comprise ultraviolet radiation shielding material such as, but not limited to, polytetrafluoroethylene, PTFE, Teflon, and/or the like.

In some embodiments, the insulation spacer component 206 defines a plurality of insulation spacer openings, similar to those described above in connection with FIG. 1A to FIG. 1C. In some embodiments, the insulation spacer component is associated with an insulation spacer width that corresponds to a width of the insulation spacer component 206 between two of the plurality of insulation spacer openings.

In the example shown in FIG. 2, the example electrode assembly 202 comprises a signal collection electrode component 204. Compared with the signal collection electrode component 103 shown in FIG. 1A to FIG. 1C, the signal collection electrode component 204 does not comprise any intermediate electrode layer. In particular, the signal collection electrode component 204 comprises two electrode layers: a first electrode layer 212 and a second electrode layer 210.

In some embodiments, the first electrode layer 212 of the signal collection electrode component 204 is disposed on a first surface of the insulation spacer component 206. For example, the first surface of the insulation spacer component 206 may correspond to a top surface of the insulation spacer component 206. In such an example, a bottom surface of the first electrode layer 212 of the signal collection electrode component 204 is in contact with the first surface of the insulation spacer component 206 (e.g. the top surface of the insulation spacer component 206).

Similar to those described above in connection with FIG. 1A to FIG. 1C, the first electrode layer 212 defines a plurality of first electrode layer openings, which provide apertures and/or gaps that allow substances and ultraviolet light to pass through. In some embodiments, the VOCs in the substances are exposed to the ultraviolet light in the first electrode layer openings, similar to those described above. In some embodiments, the first electrode layer 212 is associated with a first layer electrode width that corresponds to a width of the first electrode layer 212 between two of the plurality of first electrode layer openings, similar to those described above.

In some embodiments, the second electrode layer 210 of the signal collection electrode component 204 is positioned above the first electrode layer 212. For example, a bottom surface of the second electrode layer 210 is in contact with a top surface of the first electrode layer 212.

Similar to those described above in connection with FIG. 1A to FIG. 1C, the second electrode layer 210 defines a plurality of second electrode layer openings, which provide apertures and/or gaps that allow substances and ultraviolet light to pass through. In some embodiments, the VOCs in the substances are exposed to the ultraviolet light in the second electrode layer openings, similar to those described above. In some embodiments, the second electrode layer 210 is associated with a second layer electrode width that corresponds to a width of the second electrode layer 210 between two of the plurality of second electrode layer openings, similar to those described above.

In some embodiments, the electrode assembly 202 comprises a bias voltage electrode component 208. In some embodiments, the bias voltage electrode component 208 is disposed on a second surface of the insulation spacer component 206. In some embodiments, the second surface of the insulation spacer component 206 is opposite to the first surface of the insulation spacer component 206 described above. As described above, the first surface of the insulation spacer component 206 may correspond to a top surface of the insulation spacer component 206. The second surface of the insulation spacer component 206 may correspond to a bottom surface of the insulation spacer component 206. In such an example, a top surface of the bias voltage electrode component 208 contacts the second surface of the insulation spacer component 206 (e.g. the bottom surface of the insulation spacer component 206).

In some embodiments, the bias voltage electrode component 208 defines a plurality of bias voltage electrode openings, which provide apertures and/or gaps that allow substances and ultraviolet light to pass through. In some embodiments, the VOCs in the substances are exposed to the ultraviolet light in the bias voltage electrode openings, similar to those described above. In some embodiments, the bias voltage electrode component 208 is associated with a bias voltage electrode width that corresponds to a width of the bias voltage electrode component 208 between two of the plurality of bias voltage electrode openings, similar to those described above.

Similar to those described above in connection with FIG. 1A to FIG. 1C, the electrode assembly 202 may be positioned above an ultraviolet light source that emits ultraviolet light. For example, the insulation spacer component 206 and the bias voltage electrode component 208 are positioned between the ultraviolet light source and the signal collection electrode component 204.

In some embodiments, each of the plurality of bias voltage electrode openings is aligned with one of the plurality of insulation spacer openings, which in turn is aligned with one of the plurality of first electrode layer openings, which in turn is aligned with one of the plurality of second electrode layer openings. As such, the ultraviolet light may travel through the plurality of bias voltage electrode openings, through the plurality of insulation spacer openings, through the plurality of first electrode layer openings, and through the plurality of second electrode layer openings.

In some embodiments, the second layer electrode width associated with the second electrode layer 210 is smaller than a first layer electrode width associated with the first electrode layer 212. In other words, each of the plurality of first electrode layer openings of the first electrode layer 212 is narrower than one of the plurality of second electrode layer openings of second electrode layer 210.

In some embodiments, the first layer electrode width associated with the first electrode layer 212 is smaller than an insulation spacer width associated with the insulation spacer component 206. In other words, each of the plurality of insulation spacer openings of the insulation spacer component 206 is narrower than one of the plurality of first electrode layer openings of first electrode layer 212.

In some embodiments, the bias voltage electrode width associated with the bias voltage electrode component 208 is smaller than the insulation spacer width associated with the insulation spacer component 206. In other words, each of the plurality of insulation spacer openings of the insulation spacer component 206 is narrower than one of the plurality of bias voltage electrode openings of the bias voltage electrode component 208.

In some embodiments, the sizes of and/or the size relationships between the second layer electrode width, the first layer electrode width, the insulation spacer width, and the bias voltage electrode width can provide various technical benefits and advantages.

For example, similar to those described above in connection with FIG. 1A to FIG. 1C, ultraviolet light indicated by the arrow 242A, the arrow 242B, the arrow 242C, the arrow 242D, the arrow 242E, and the arrow 242F may travel through an insulation spacer opening at an acute angle from the first surface of the insulation spacer component 206 (e.g. the top surface of the insulation spacer component 206). Because the first layer electrode width of the first electrode layer 212 is smaller than the insulation spacer width of the insulation spacer component 206, the ultraviolet light does not impinge on the first electrode layer 212 (e.g. the electrode of the first electrode layer 212 is not exposed to the ultraviolet light), thereby decreasing the baseline value. Similarly, because the second layer electrode width of the second electrode layer 210 is smaller than the first layer electrode width of the first electrode layer 212, the ultraviolet light does not impinge on the second electrode layer 210 (e.g. the electrode of the second electrode layer 210 is not exposed to the ultraviolet light), thereby decreasing the baseline value.

Similar to those described above in connection with FIG. 1A to FIG. 1C, the bias voltage electrode component 208 may receive a bias voltage, and the signal collection electrode component 204 may receive a signal collection voltage. In some embodiments, the bias voltage is higher than the signal collection voltage, creating an electric field that attracts positively charged particles to the signal collection electrode component 204 and negatively charged particles to the bias voltage electrode component 208. Because the second layer electrode width is smaller than the first layer electrode width, a part of the top surface of the first electrode layer 212 is exposed to collect the positively charged ions due to the ionizations of the VOCs. As such, the sizes of and/or the size relationships between the second layer electrode width, the first layer electrode width, the insulation spacer width, and the bias voltage electrode width in accordance with various embodiments of the present disclosure can increase ion collection efficiency.

Figure 3:
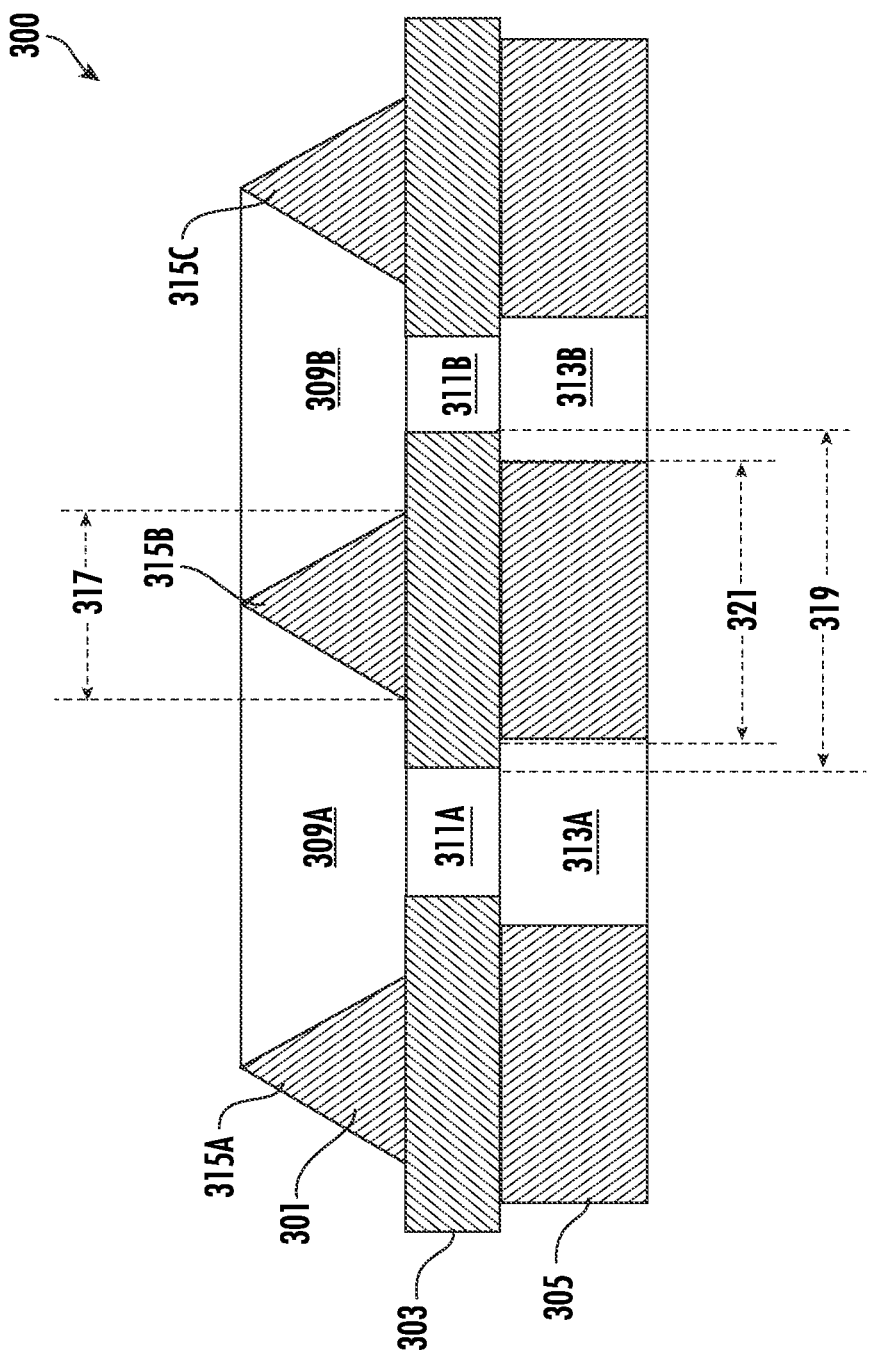
FIG. 3 illustrates an example schematic diagram of an example electrode assembly of an example photoionization detector in accordance with various embodiments of the present disclosure.

Referring now to FIG. 3, an example schematic diagram of an example electrode assembly 300 for an example photoionization detector in accordance with various embodiments of the present disclosure is illustrated.

In the example shown in FIG. 3, the example electrode assembly 300 comprises an insulation spacer component 303, similar to the example insulation spacer component 105 described above in connection with FIG. 1A, FIG. 1B, and FIG. 1C. For example, the example insulation spacer component 303 may comprise ultraviolet radiation shielding material such as, but not limited to, polytetrafluoroethylene, PTFE, Teflon, and/or the like.

In some embodiments, the insulation spacer component 303 defines a plurality of insulation spacer openings, similar to those described above in connection with FIG. 1A to FIG. 1C. For example, as shown in FIG. 3, the insulation spacer component 303 may comprise the insulation spacer opening 311A and the insulation spacer opening 311B. In some embodiments, the insulation spacer component 303 is associated with an insulation spacer width 319 that corresponds to a width of the insulation spacer component 303 between two of the plurality of insulation spacer openings (for example, between the insulation spacer opening 311A and the insulation spacer opening 311B), similar to those described above. In some embodiments, the plurality of insulation spacer openings (including the insulation spacer opening 311A and the insulation spacer opening 311B) provide apertures and/or gaps that allow substances and ultraviolet light to pass through.

In the example shown in FIG. 3, the example electrode assembly 300 comprises a signal collection electrode component 301. In some embodiments, the signal collection electrode component 301 is disposed on a first surface of the insulation spacer component 303. In some embodiments, the first surface of the insulation spacer component 303 may correspond to a top surface of the insulation spacer component 303.

In some embodiments, the signal collection electrode component 301 comprises one or more electrodes. For example, one or more bottom surfaces of the one or more electrodes of the signal collection electrode component 301 are in contact with the first surface of the insulation spacer component 303 (e.g. the top surface of the insulation spacer component 303).

In some embodiments, the one or more electrodes are in triangular prism shapes (also referred to as "triangular prism shaped electrodes"). For example, a cross-sectional view of a triangular prism shaped electrode along a vertical plane may show a triangular shape. In the example shown in FIG. 3, the one or more triangular prism shaped electrodes include the triangular prism shaped electrode 315A, the triangular prism shaped electrode 315B, and the triangular prism shaped electrode 315C.

In some embodiments, the signal collection electrode component 301 defines a plurality of signal collection electrode openings. For example, the gap between two triangular prism shaped electrodes creates a signal collection electrode opening. In the example shown in FIG. 3, the plurality of signal collection electrode openings include a signal collection electrode opening 309A and a signal collection electrode opening 309B.

In some embodiments, at least one of the one or more triangular prism shaped electrodes is between two of the plurality of signal collection electrode openings. In the example shown in FIG. 3, the triangular prism shaped electrode 315B is between the signal collection electrode opening 309A and the signal collection electrode opening 309B.

In some embodiments, the plurality of signal collection electrode openings (including the signal collection electrode opening 309A and the signal collection electrode opening 309B) provide apertures and/or gaps that allow substances and ultraviolet light to pass through. In some embodiments, VOCs in the substances are exposed to the ultraviolet light in the signal collection electrode openings, similar to those described above.

In some embodiments, each of the one or more triangular prism shaped electrodes is associated with a bottom width 317. In the example shown in FIG. 3, the bottom width 317 corresponds to a width of a bottom surface of the triangular prism shaped electrode 315B that is in contact with the insulation spacer component 303.

In some embodiments, the example electrode assembly 300 comprises a bias voltage electrode component 305.

In some embodiments, the bias voltage electrode component 305 is disposed on a second surface of the insulation spacer component 303. In some embodiments, the second surface of the insulation spacer component 303 is opposite to the first surface of the insulation spacer component 303 described above. For example, the first surface of the insulation spacer component 303 may correspond to a top surface of the insulation spacer component 303, and the second surface of the insulation spacer component 303 may correspond to a bottom surface of the insulation spacer component 303. In such an example, a top surface of the bias voltage electrode component 305 contacts the second surface of the insulation spacer component 303 (e.g. the bottom surface of the insulation spacer component 303).

In some embodiments, the bias voltage electrode component 305 defines a plurality of bias voltage electrode openings. In the example shown in FIG. 3, the bias voltage electrode component 305 defines a bias voltage electrode opening 313A and a bias voltage electrode opening 313B. In some embodiments, the plurality of bias voltage electrode openings provide apertures and/or gaps that allow substances and ultraviolet light to pass through.

Similar to those described above in connection with FIG. 1A to FIG. 1C, the electrode assembly 300 may be positioned above an ultraviolet light source that emits ultraviolet light. In some embodiments, each of the plurality of bias voltage electrode openings is aligned with one of the plurality of insulation spacer openings, and each of the plurality of insulation spacer openings is aligned with one of the plurality of signal collection electrode openings. As such, ultraviolet light may travel through the plurality of bias voltage electrode openings, through the plurality of insulation spacer openings, and through the plurality of signal collection electrode openings.

In some embodiments, the bias voltage electrode component 305 is associated with a bias voltage electrode width 321. In some embodiments, the bias voltage electrode width 321 corresponds to a width of the bias voltage electrode component 305 between two of the plurality of bias voltage electrode openings (including the bias voltage electrode opening 313A and the bias voltage electrode opening 313B). In the example shown in FIG. 3, the bias voltage electrode width 321 corresponds to a width of the bias voltage electrode component 305 between the bias voltage electrode opening 313A and the bias voltage electrode opening 313B.

In some embodiments, the bottom width 317 associated with the triangular prism shaped electrode (for example, the triangular prism shaped electrode 315B) of the signal collection electrode component 301 is smaller than the insulation spacer width 319 associated with the insulation spacer component 303. In other words, each of the plurality of insulation spacer openings (including the insulation spacer opening 311A and the insulation spacer opening 311B) of the insulation spacer component 303 is narrower than one of the plurality of signal collection electrode openings of signal collection electrode component 301 (including the signal collection electrode opening 309A and the signal collection electrode opening 309B).

In some embodiments, the bias voltage electrode width 321 associated with the bias voltage electrode component 305 is smaller than the insulation spacer width 319 associated with the insulation spacer component 303. In other words, each of the plurality of insulation spacer openings of the insulation spacer component 303 is narrower than one of the plurality of bias voltage electrode openings of the bias voltage electrode component 305.

In some embodiments, the triangular prism shapes of electrodes of the signal collection electrode component 301, as well as the sizes of and/or the size relationships between the bottom width 317 of the triangular prism shaped electrode, the insulation spacer width 319, and the bias voltage electrode width 321, can provide various technical benefits and advantages.

For example, similar to those described above in connection with FIG. 1A to FIG. 1C, ultraviolet light may travel through an insulation spacer opening at an acute angle from the first surface (e.g. the top surface) of the insulation spacer component 303. Because the signal collection electrode component 301 comprises one or more triangular prism shaped electrodes and the bottom width associated with the triangular prism shaped electrode is smaller than the insulation spacer width of the insulation spacer component 206, the ultraviolet light does not impinge on the signal collection electrode component 301 (e.g. the triangular prism shaped electrode is not exposed to ultraviolet light), thereby decreasing the baseline value.

Similar to those described above in connection with FIG. 1A to FIG. 1C, the bias voltage electrode component 305 may receive a bias voltage, and the signal collection electrode component 301 may receive a signal collection voltage. In some embodiments, the bias voltage is higher than the signal collection voltage, creating an electric field that attracts positively charged particles to the signal collection electrode component 301 and negatively charged particles to the bias voltage electrode component 305. Because the signal collection electrode component 301 comprises one or more triangular prism shaped electrodes that are in triangular prism shapes, the side surfaces of triangular prism shaped electrodes can collect more positively charged ions compared to side surfaces of electrodes that are in cuboid shapes. As such, triangular prism shapes of the triangular prism shaped electrodes in accordance with various embodiments of the present disclosure can provide technical advantages and benefits such as increasing ion collection efficiency.

Figure 4:
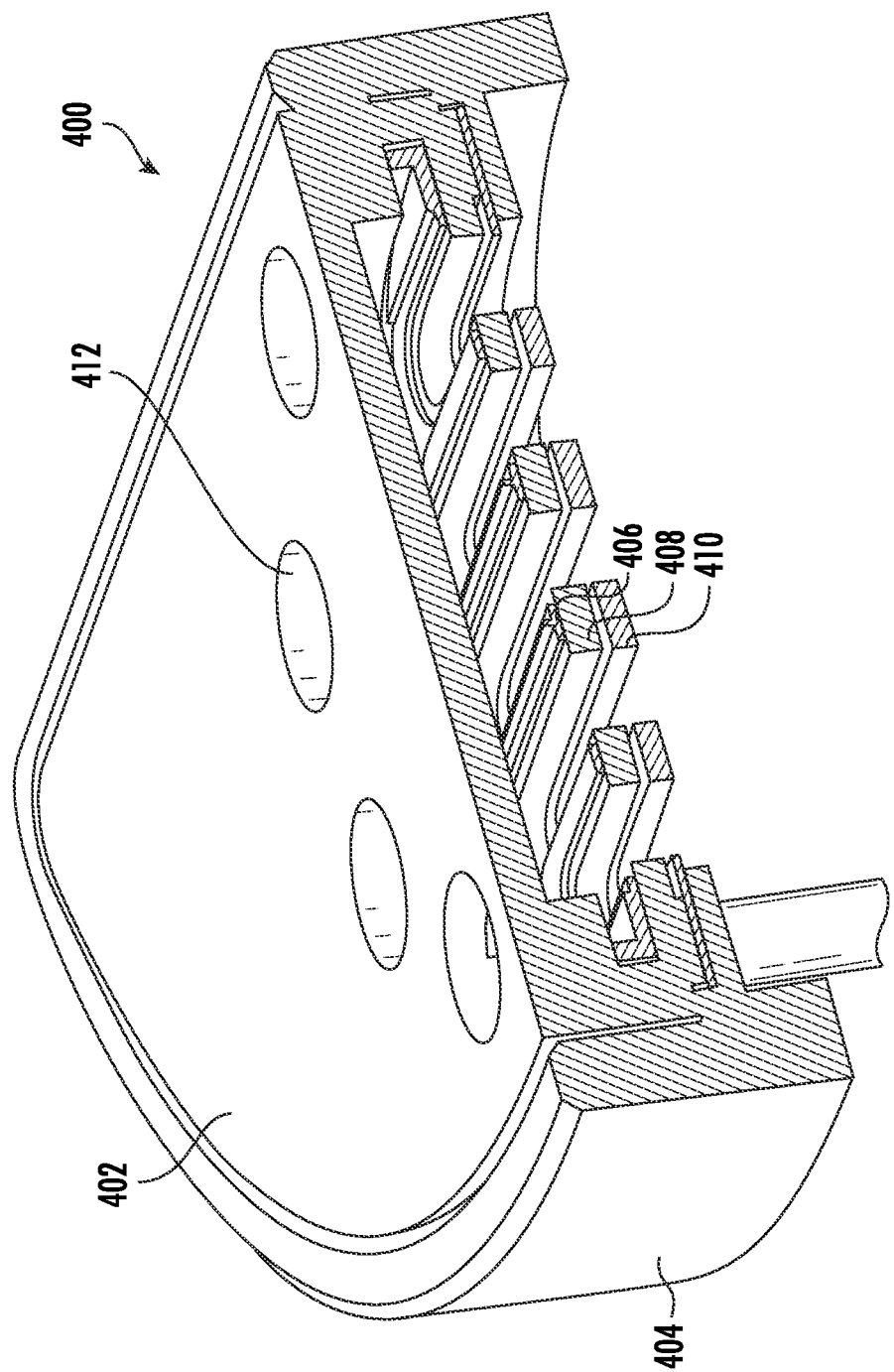
FIG. 4 illustrates an example cross-sectional view of an example electrode assembly in accordance with various embodiments of the present disclosure.

Referring now to FIG. 4, an example cross-sectional view of an example electrode assembly 400 is illustrated. In particular, FIG. 4 illustrates an example cross-sectional view of the example electrode assembly 400 when the example electrode assembly 400 is cut through a symmetry axis of the example electrode assembly 400.

In the example shown in FIG. 4, the example electrode assembly 400 comprises an insulating top cover component 402 and an insulating bottom cover component 404.

In some embodiments, the insulating top cover component 402 and the insulating bottom cover component 404 may comprise ultraviolet radiation shielding material. For example, the insulating top cover component 402 and the insulating bottom cover component 404 may comprise polytetrafluoroethylene, PTFE, Teflon, and/or the like.

In some embodiments, the insulating top cover component 402 and the insulating bottom cover component 404 are secured to one another through, such as but not limited to, mechanical means (for example, but not limited to, snap fit mechanisms) and/or chemical means (for example, but not limited to, chemical glues). In some embodiments, the space between the insulating top cover component 402 and the insulating bottom cover component 404 provides housing for various components of the example electrode assembly 400.

For example, the example electrode assembly 400 may comprise a signal collection electrode component 406, an insulation spacer component 408, and a bias voltage electrode component 410. In some embodiments, the signal collection electrode component 406, the insulation spacer component 408, and the bias voltage electrode component 410 are secured between the insulating top cover component 402 and the insulating bottom cover component 404. For example, the signal collection electrode component 406 is positioned on a top surface of the insulation spacer component 408, and the insulation spacer component 408 is positioned on a top surface of the bias voltage electrode component 410.

In some embodiments, the signal collection electrode component 406 shown in FIG. 4 is similar to the signal collection electrode component 103 described above in connection with FIG. 1A to FIG. 1C, the signal collection electrode component 204 described above in connection with FIG. 2, and/or the signal collection electrode component 301 described above in connection with FIG. 3. For example, the signal collection electrode component 406 may comprise one or more electrode layers, and the one or more electrode layers are stacked upon one another such that the one or more electrode layers together form the signal collection electrode component 406. In some embodiments, the one or more electrode layers of the signal collection electrode component 406 are successively receding, similar to those described above.

Similarly, each of the one or more electrode layers may comprise one or more electrode layer openings, and electrode layer openings of different electrode layers are aligned with one another to form a plurality of signal collection electrode openings.

In some embodiments, the insulation spacer component 408 shown in FIG. 4 is similar to the insulation spacer component 105 described above in connection with FIG. 1A to FIG. 1C, the insulation spacer component 206 described above in connection with FIG. 2, and/or the insulation spacer component 303 described above in connection with FIG. 3. For example, the insulation spacer component 303 may define a plurality of insulation spacer openings.

In some embodiments, the bias voltage electrode component 410 shown in FIG. 4 is similar to the bias voltage electrode component 107 described above in connection with FIG. 1A to FIG. 1C, the bias voltage electrode component 208 described above in connection with FIG. 2, and/or the bias voltage electrode component 305 described above in connection with FIG. 3. For example, the bias voltage electrode component 410 may define a plurality of bias voltage electrode openings.

In the example shown in FIG. 4, the insulating top cover component 402 comprises a plurality of top cover openings (such as, but not limited to, a top cover opening 412). Each of the plurality of top cover openings provide apertures and/or gaps that allow substances to pass through (for example, substances that may comprise VOCs).

In some embodiments, when the example electrode assembly 400 is assembled, the plurality of top cover openings of the insulating top cover component 402 at least partially overlap with the plurality of signal collection electrode openings of the signal collection electrode component 406, such that gaseous substance may pass through the plurality of top cover openings to the plurality of signal collection electrode openings. Similar to those described above, the plurality of signal collection electrode openings of the signal collection electrode component 406 are aligned with the plurality of insulation spacer openings of the insulation spacer component 408, which are aligned with the plurality of bias voltage electrode openings of the bias voltage electrode component 410. As such, the gaseous substance may pass through the plurality of insulation spacer openings and the plurality of bias voltage electrode openings.

Similar to those described above, the example electrode assembly 400 may be positioned above an ultraviolet light source. In some embodiments, the ultraviolet light source may emit ultraviolet light through the plurality of bias voltage electrode openings of the bias voltage electrode component 410, then through the plurality of insulation spacer openings of the insulation spacer component 408, and then through the plurality of signal collection electrode openings of the signal collection electrode component 406. As described above, gaseous substance that includes VOCs may pass through the plurality of signal collection electrode openings, then through the plurality of insulation spacer openings, and then through the plurality of bias voltage electrode openings. As such, ionization of VOCs in the gaseous substances may occur, similar to those described above. Because the one or more electrode layers of the signal collection electrode component 406 are successively receding, the ultraviolet light does not impinge on the signal collection electrode component 406. As such, various embodiments of the present disclosure may provide technical benefits and advantages such as reducing the baseline value of the photoionization detector.

Similar to those described above, the signal collection electrode component 406 may receive a signal collection voltage, and the bias voltage electrode component 410 may receive a bias voltage. In some embodiments, the bias voltage is higher than the signal collection voltage, so that the signal collection electrode component 406 and the bias voltage electrode component 410 create an electric field that attracts positively charged particles to the signal collection electrode component 406 and negatively charged particles to the bias voltage electrode component 410. The ionization of VOCs causes electrons to be emitted or released from VOCs and creates positively charged ions, and the positively charged ions are attracted to the surface of the signal collection electrode component 406. Similar to those described above, the collection surface of the signal collection electrode component 406 that collects positively charged ions due to the ionization of the VOCs resembles that of a series of stairs, and the size of the collection surface of the signal collection electrode component 406 is bigger than a size of a collection surface of a signal collection electrode component without a layered structure. As such, various examples of the present disclosure may increase the ion collection efficiency.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A photoionization detector comprising:
   an insulation spacer component comprising ultraviolet radiation shielding material, wherein the insulation spacer component comprises a first surface and a second surface; and
   a signal collection electrode component disposed on the first surface of the insulation spacer component and comprising a first electrode layer and a second electrode layer, wherein the first electrode layer is disposed between the insulation spacer component and the second electrode layer, wherein a second layer electrode width associated with the second electrode layer is smaller than a first layer electrode width associated with the first electrode layer,
   wherein the first electrode layer defines a plurality of first electrode layer openings, wherein the first layer electrode width corresponds to a width of the first electrode layer between two of the plurality of first electrode layer openings,
   wherein the second electrode layer defines a plurality of second electrode layer openings, wherein the second layer electrode width corresponds to a width of the second electrode layer between two of the plurality of second electrode layer openings, and
   wherein a bias voltage electrode component is disposed on the second surface of the insulation spacer component.

2. The photoionization detector of claim 1, wherein the second surface of the insulation spacer component is opposite to the first surface of the insulation spacer component.

3. The photoionization detector of claim 2, wherein the signal collection electrode component is applied with a signal collection voltage, wherein the bias voltage electrode component is applied with a bias voltage.

4. The photoionization detector of claim 3, wherein the bias voltage is higher than the signal collection voltage.

5. The photoionization detector of claim 1, wherein the insulation spacer component defines a plurality of insulation spacer openings.

6. The photoionization detector of claim 5, wherein each of the plurality of insulation spacer openings is aligned with one of the plurality of first electrode layer openings, wherein each of the plurality of first electrode layer openings is aligned with the one of the plurality of second electrode layer openings.

7. The photoionization detector of claim 6, wherein each of the plurality of insulation spacer openings is narrower than one of the plurality of first electrode layer openings, wherein each of the plurality of first electrode layer openings is narrower than one of the plurality of second electrode layer openings.

8. The photoionization detector of claim 1, further comprising an ultraviolet light source, wherein the insulation spacer component is positioned between the ultraviolet light source and the signal collection electrode component.

9. The photoionization detector of claim 8, wherein ultraviolet light from the ultraviolet light source does not impinge on the first electrode layer of the signal collection electrode component and does not impinge on the second electrode layer of the signal collection electrode component.

10. The photoionization detector of claim 1, wherein the signal collection electrode component comprises at least one intermediate electrode layer that is positioned between the first electrode layer and the second electrode layer.

11. The photoionization detector of claim 10, wherein the at least one intermediate electrode layer defines a plurality of intermediate electrode layer openings, wherein an intermediate layer electrode width associated with the at least one intermediate electrode layer is smaller than the first layer electrode width and larger than the second layer electrode width.

12. The photoionization detector of claim 11, wherein the intermediate layer electrode width corresponds to a width of the at least one intermediate electrode layer between two of the plurality of intermediate electrode layer openings.

13. The photoionization detector of claim 1, wherein the plurality of first electrode layer openings, a plurality of intermediate electrode layer openings, and the plurality of second electrode layer openings are aligned with each other.

14. The photoionization detector of claim 1, wherein each of the plurality of first electrode layer openings is narrower than one of a plurality of intermediate electrode layer openings, wherein each of the plurality of intermediate electrode layer openings is narrower than one of the plurality of second electrode layer openings.

15. The photoionization detector of claim 1, wherein the signal collection electrode component defines a plurality of signal collection electrode openings, wherein the signal collection electrode component comprises a triangular prism shaped electrode between two of the plurality of signal collection electrode openings.

16. The photoionization detector of claim 15, wherein the insulation spacer component defines a plurality of insulation spacer openings.

17. The photoionization detector of claim 16, wherein each of the plurality of insulation spacer openings is aligned with one of the plurality of signal collection electrode openings.

* * * * *